(12) United States Patent
McVaugh

(10) Patent No.: US 9,975,740 B2
(45) Date of Patent: May 22, 2018

(54) LIFT DEVICE

(71) Applicant: Arthur McVaugh, Green Lane, PA (US)

(72) Inventor: Arthur McVaugh, Green Lane, PA (US)

(*) Notice: Subject to any disclaimer, the term of this patent is extended or adjusted under 35 U.S.C. 154(b) by 0 days. days.

(21) Appl. No.: 14/737,211

(22) Filed: Jun. 11, 2015

(65) Prior Publication Data

US 2016/0362281 A1 Dec. 15, 2016

(51) Int. Cl.
*B66C 23/44* (2006.01)
*B60P 1/54* (2006.01)

(52) U.S. Cl.
CPC .............. *B66C 23/44* (2013.01); *B60P 1/548* (2013.01); *B60P 1/5433* (2013.01); *B60P 1/5495* (2013.01)

(58) Field of Classification Search
CPC ..... B60P 1/5404; B60P 1/5423; B60P 1/5428; B60P 1/5433; B60P 1/548; B60P 1/5495; B66C 23/166; B66C 23/44; B66C 23/86
USPC .......................................................... 192/121
See application file for complete search history.

(56) References Cited

U.S. PATENT DOCUMENTS

| 2,594,076 | A | * | 4/1952 | Schlein | B60P 1/5433 212/181 |
| 2,933,210 | A | * | 4/1960 | Dye | B60P 1/5433 414/411 |
| 2,956,691 | A | * | 10/1960 | Fangman | B60P 1/5433 212/231 |
| 3,638,804 | A | * | 2/1972 | Blakeway | B60P 1/5428 212/237 |
| 3,696,713 | A | * | 10/1972 | Ragard | F15B 15/12 91/357 |
| 4,067,471 | A | * | 1/1978 | Roatcap | B66C 23/44 172/439 |
| 4,260,064 | A | * | 4/1981 | Ekstam | B66C 23/702 212/231 |
| 4,492,150 | A | * | 1/1985 | Yates | F15B 15/12 417/481 |
| 4,817,504 | A | * | 4/1989 | Lieberman | F15B 15/12 92/121 |
| 4,881,419 | A | * | 11/1989 | Weyer | B60G 21/0553 74/424.92 |
| 5,106,255 | A | * | 4/1992 | Motoda | B60P 1/5433 212/238 |
| 5,123,333 | A | * | 6/1992 | Sollami | F01C 21/104 92/121 |
| 5,440,970 | A | * | 8/1995 | Tonsor | F15B 15/12 414/684 |

(Continued)

Primary Examiner — James Keenan
(74) Attorney, Agent, or Firm — Baker Hostetler LLP; Gregory A. Grissett

(57) ABSTRACT

A lift device comprises a mounting arm that includes a mounting member that is configured to be mounted to a structure. The lift device includes a vertical member having a lower end and an upper end spaced from the lower end along a first axis that is aligned with the vertical direction. A lifting boom includes a first end coupled to the upper end of the vertical member and the second end is configured to be secured to the object. The lift device includes a first actuation system disposed along the vertical member and configured to cause the lifting boom to rotate about the first axis. The lift device also includes a second actuation system configured to cause the lifting boom to rotate about a second axis that is perpendicular to the first axis.

11 Claims, 9 Drawing Sheets

(56) References Cited

U.S. PATENT DOCUMENTS

| | | | | |
|---|---|---|---|---|
| 5,492,051 | A * | 2/1996 | Schiffler | B60G 21/0555 |
| | | | | 92/121 |
| 5,730,304 | A * | 3/1998 | Duncan | B60P 1/5433 |
| | | | | 212/180 |
| 6,042,328 | A * | 3/2000 | McVaugh | B60P 1/5495 |
| | | | | 212/180 |
| 6,547,507 | B1 * | 4/2003 | Gest | B66C 23/44 |
| | | | | 212/180 |
| 6,688,836 | B2 * | 2/2004 | Gourand | B66C 23/44 |
| | | | | 414/541 |
| 7,370,769 | B2 * | 5/2008 | Picard | B66C 23/202 |
| | | | | 212/292 |
| 7,377,740 | B2 * | 5/2008 | Panzarella | B60P 1/5433 |
| | | | | 212/180 |
| 2006/0162548 | A1 * | 7/2006 | Patterson | F01C 9/002 |
| | | | | 92/121 |
| 2009/0067968 | A1 * | 3/2009 | McVaugh | B60P 1/5428 |
| | | | | 414/550 |

* cited by examiner

LIFT DEVICE

TECHNICAL FIELD

The present disclosure relates to a lift device configured to lift an object onto and off a structure, such as a vehicle.

BACKGROUND

Lift devices are used to move heavy objects from one location to another location. Some lift devices are designed for mounting to a vehicle, such as a truck, and can load and unload objects onto and off of the truck bed. A typical vehicle mounted lift device has a mounting arm connected to the vehicle, a vertical shaft, and a lifting boom with a lift or working head that is secured to the object. The lifting boom can rotate about a horizontal axis with respect to the surface upon which the vehicle is parked. In some designs, the lifting boom is manually rotatable about a vertical axis that is orthogonal to the horizontal axis but to a limited extent, e.g. up to about 90 degrees in total. An example of a manually rotatable lift device is my U.S. Patent Pub. No. 2009/0067968 to McVaugh. Manually rotatable lifting booms exhibit instability during use. For instance, if the object sways substantially, the lift point—the location where the lift device is connected the object—sways out of alignment with the working head of the lifting boom and the vertical axis negatively impacting lifting boom stability during rotation. In situations where the lift device is inclined, gravity forces the object out of alignment with the lift head and can hinder the ability of the lift boom to rotate about the vertical axis in a direction up the incline.

SUMMARY

An embodiment of the present disclosure a lift device configured to be mounted carry an object from one location to another location. The lift device includes a mounting arm that includes a mounting member, the mounting member configured to be mounted to a structure. The lift device also includes a vertical member that extends relative to the mounting arm along a vertical direction, the vertical member including a lower end, and an upper end spaced from the lower end along a first axis that is aligned with the vertical direction. A lifting boom includes a first end and a second end and the first end is coupled to the upper end of the vertical member, and the second end is configured to be secured to the object. The lift device includes a first actuation system disposed along the vertical member and that is configured to, in response to an electrical input, cause the lifting boom to rotate about the first axis. The lift device also includes a second actuation system configured to cause the lifting boom to rotate about a second axis that is perpendicular to the first axis.

BRIEF DESCRIPTION OF THE DRAWINGS

The foregoing summary, as well as the following detailed description of an example embodiment of the application, will be better understood when read in conjunction with the appended drawings, in which there is shown in the drawings example embodiments for the purposes of illustration. It should be understood, however, that the application is not limited to the precise arrangements and systems shown. In the drawings.

DETAILED DESCRIPTION OF ILLUSTRATIVE EMBODIMENTS

Figure 1:
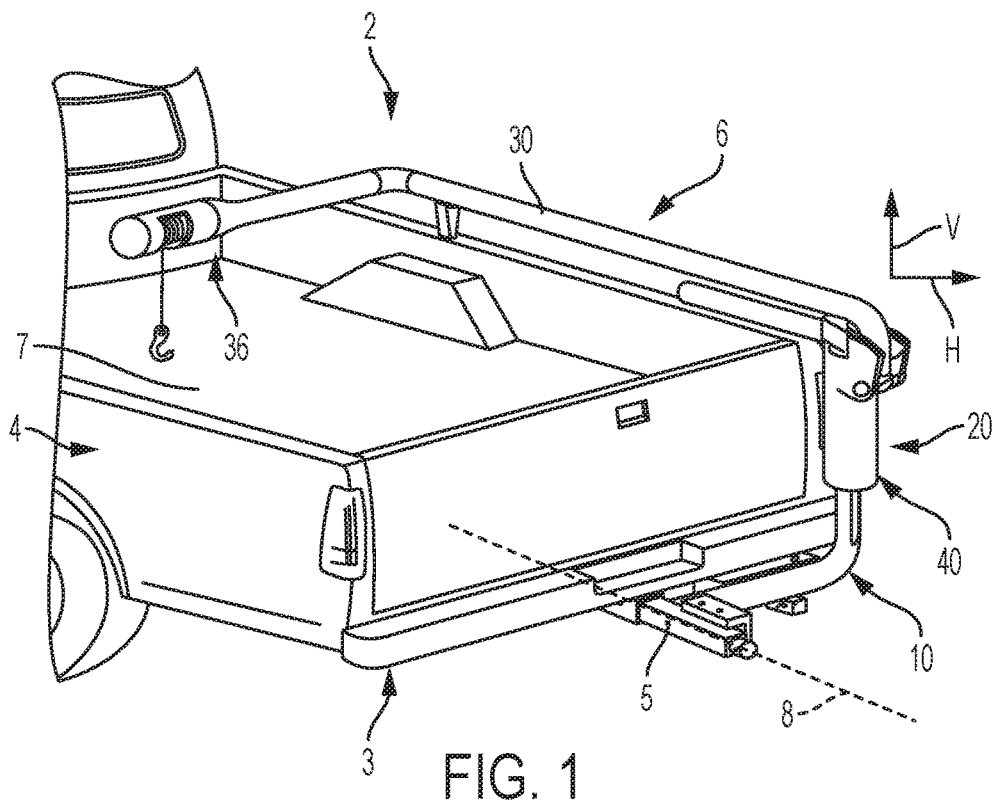
FIG. 1 is a perspective view of a lift device mounted to a vehicle in accordance with an embodiment of the present disclosure.
Figure 2:
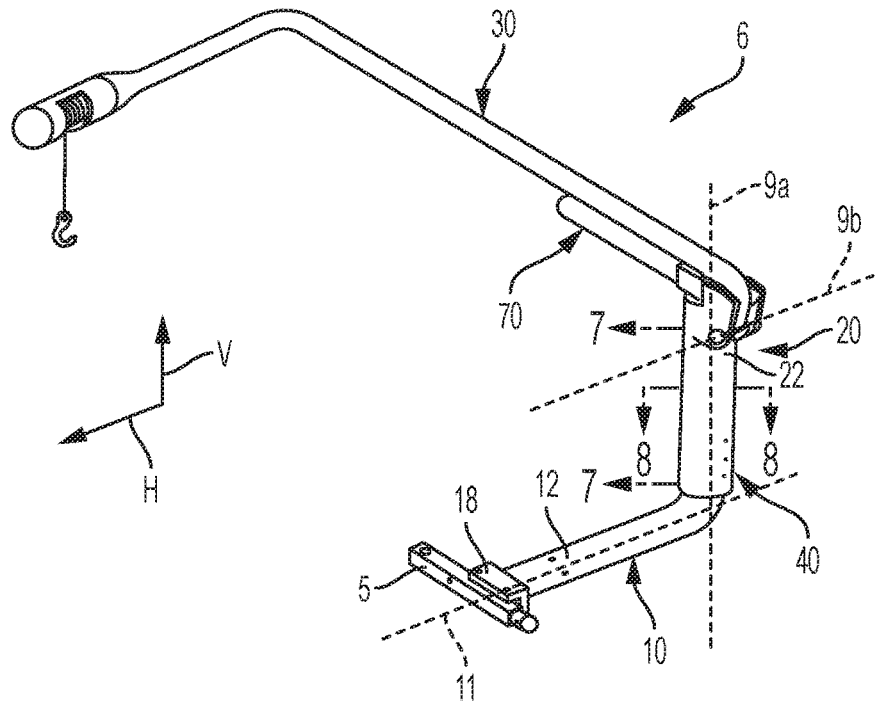
FIG. 2 is a perspective view of the lift device shown in FIG. 1.

FIGS. 1 and 2 illustrate a lifting system 2 that includes a vehicle 4 and a lift device 6 mounted to a rear end 3 of the vehicle 4. As illustrated, the lift device 6 is mounted to a hitch mount 5 of the vehicle 4 that extends from a chassis (not numbered) in a rearward direction C along a vehicle centerline 8. The lift device 6 includes a working end 36 that can be attached to an object O on the surface S (object O and surface S shown in FIG. 3). The lift device 6 is configured to move the object O between a location on the rear bed 7 of the vehicle 4 and a location on the surface S next to the vehicle 4. The lift device 6 is shown mounted to the rear of a truck. But the lift device 6 can be mounted to a small vehicle, such as tractor or other all-terrain vehicle, a cart, loading dock, platform, or other structure. Accordingly, the lift device 6 is not limited to use with a vehicle. A "structure" as used herein can include a vehicle, such as truck, a tractor or other all-terrain vehicle, a cart, loading dock, platform, rigid chassis or frame.

Figure 3:
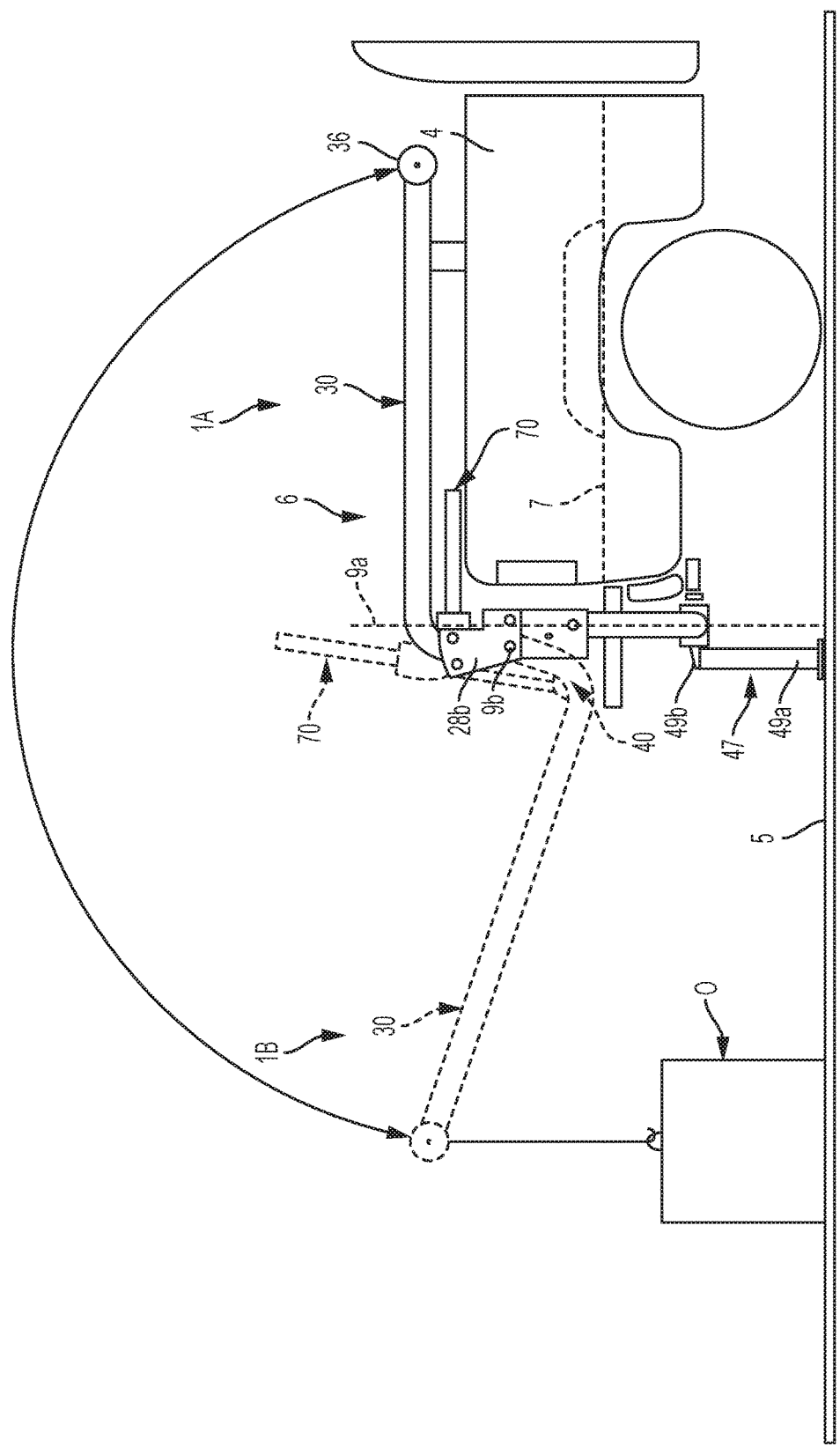
FIG. 3 is a side elevation of the lift device and a portion of the vehicle shown in FIG. 1, illustrating transition of the lift device between the stowed configuration 1A and a working configuration 1B.

As shown in FIG. 2, the lift device 6 includes a mounting arm 10, a vertical member 20, a lifting boom 30 coupled to the vertical member 20, a first actuation system 40 operably coupled along the vertical member 20, and a second actuation system 70 operably coupled to the lifting boom 30 and a part of the vertical member 20. The first actuation system 40 can rotate the lifting boom 30 about a vertical axis 9a that extends along the vertical direction V, and the second actuation system 70 can rotate the lifting boom 30 about a horizontal axis 9b that is aligned with the horizontal direction H. The lift device 6 further includes a stabilizing linkage 90 (FIG. 10) that maintains the stability and position of the second actuation system 70 during rotation of the lifting boom 30. As shown in FIG. 3, the lift device 6 can transition between a stowed configuration 1A where the lifting boom 30 is stowed and working end 36 is positioned above centerline 8, and a loading configuration 1B wherein the lifting boom 30 has been rotated about one or both of the first axis 9a and the second axis 9b such the working end 36 is positioned over the side or rear of the vehicle 4. Operation of first and second actuation systems 40 and 70 to rotate the lifting boom 30 about two axes 9a and 9b will be further detailed below.

Figure 4:
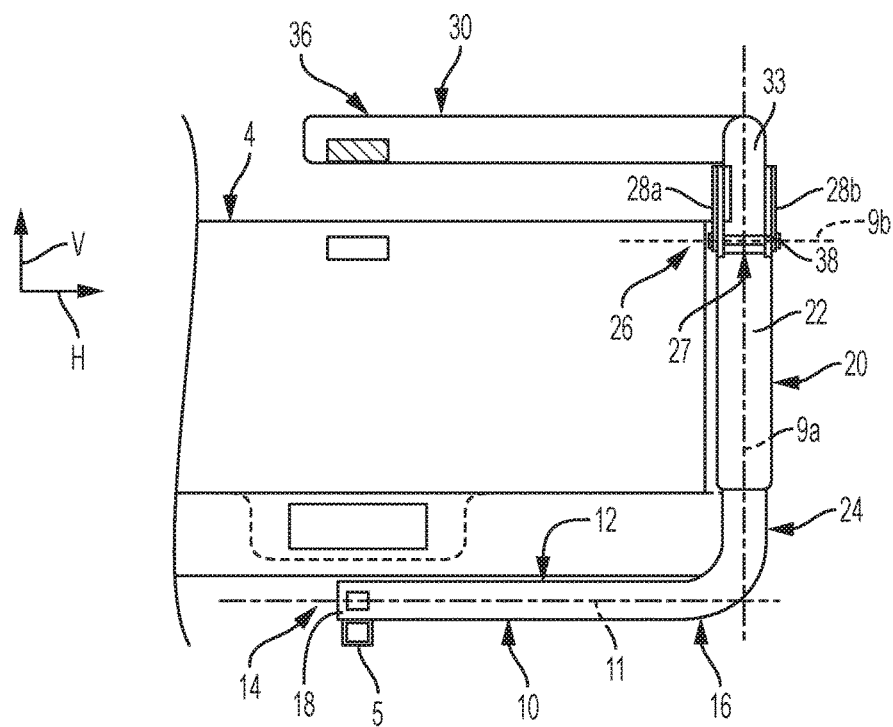
FIG. 4 is a rear elevation view of the lift device and a portion of the vehicle shown in FIG. 1.
Figure 5:
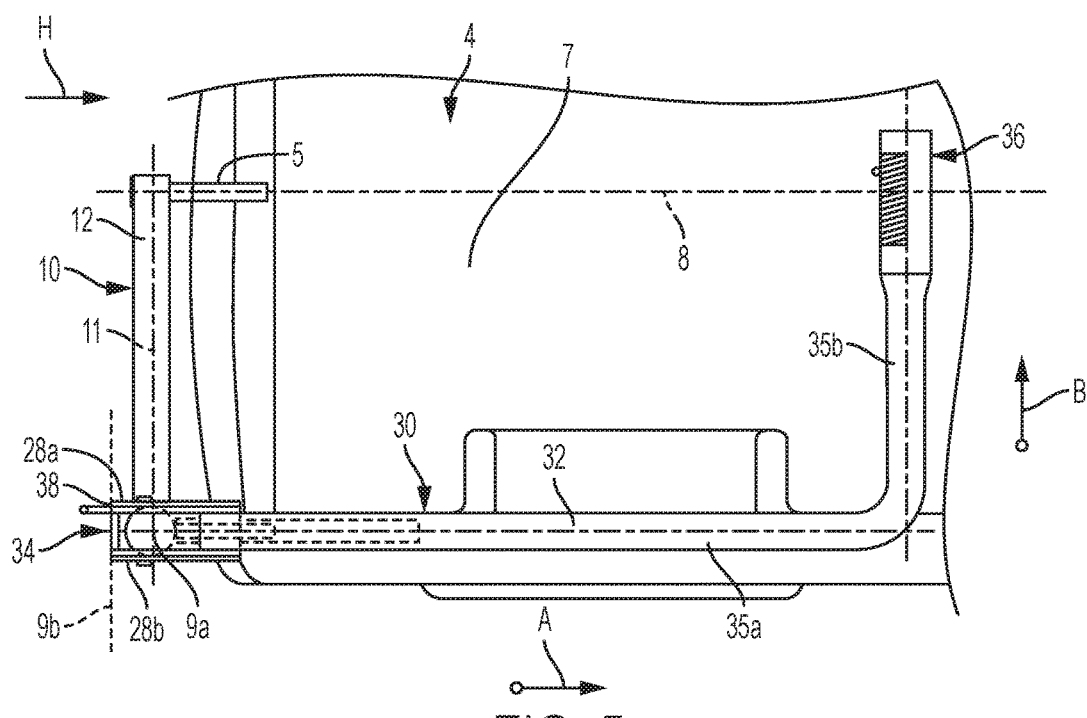
FIG. 5 is a top plan view of the lift device and a portion of the vehicle shown in FIG. 1, illustrating the lift device in a stowed configuration.
Figure 6:
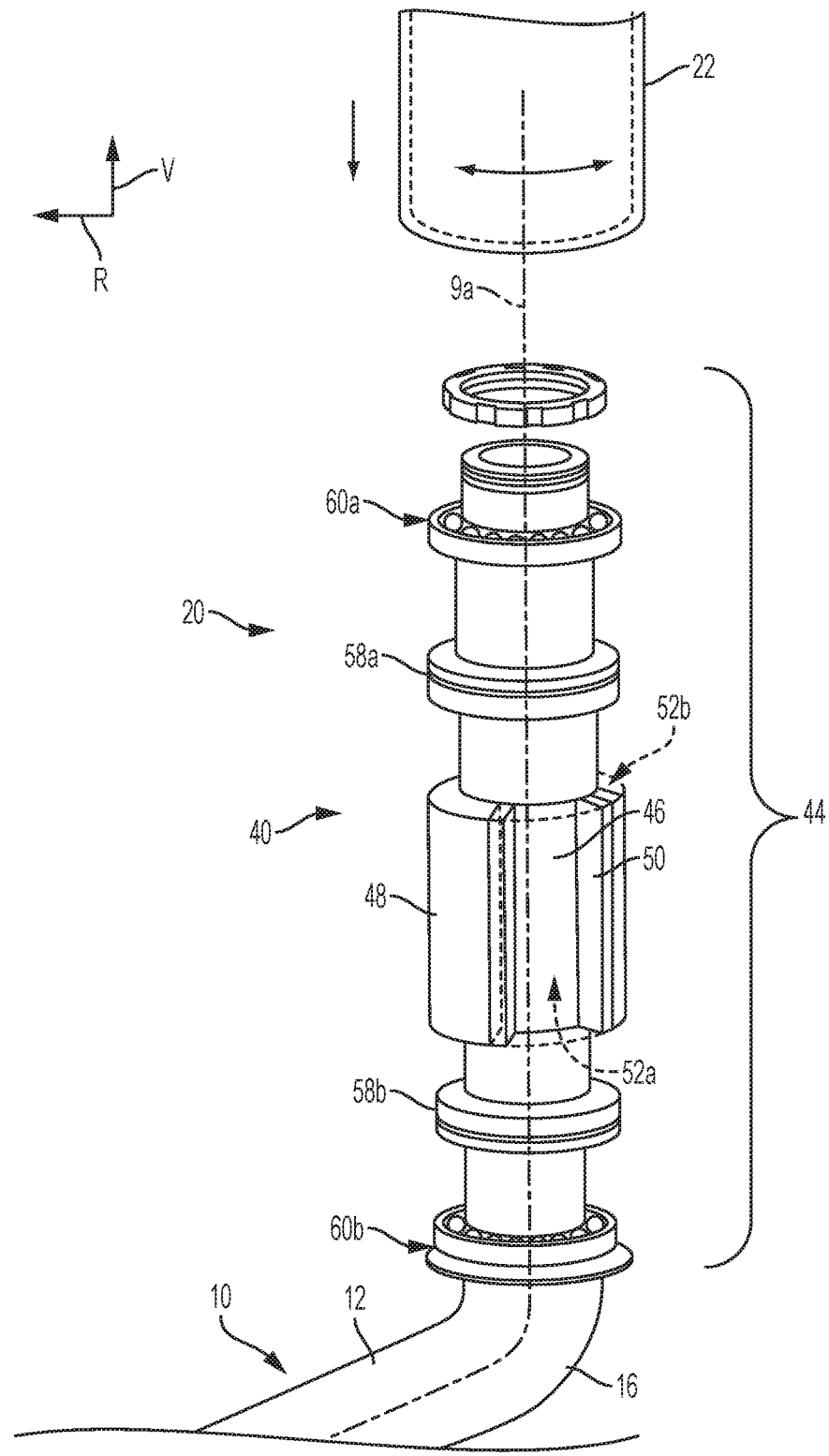
FIG. 6 is an exploded perspective view of a portion of the lift device shown in FIG. 2, illustrating components of a first actuation system.

Turning to FIGS. 2, 4 and 5, the mounting arm 10 includes a mount body 12 having a first end 14 and a second end 16 opposed to the first end 14 along a mounting arm axis 11. The mounting arm 10 includes a mounting member 18 configured to be attached to the hitch mount 5 or directly to the rear chassis (not shown). The mount body 12 may be a rigid, tubular structure sized to support the mass of the vertical member 20, actuation systems 40 and 70, and lifting boom 30. Electric components and wiring may be housed in the mount body 12. The mounting member 18 can be a clamp, brace, bracket, fasteners, housing or any device that is attachable to a hitch mount 5, chassis, or frame. As illustrated, the mounting arm 10 extends along the horizontal direction H such that the mounting arm is parallel to rear bumper (not numbered) of the vehicle. This permits operation of the tailgate as needed. In alternative embodiments, however, the mounting arm 10 when mounted to the vehicle or other structure can be inclined with respect to the horizontal direction H. Furthermore, the mounting arm 10 can be curvilinear or include a curved component. As shown in FIG. 3, the lift device 6 may also include a support brace 47 coupled to the mounting arm 10. The support brace 47 has a base assembly 49a for positioning against the surface S, and a support plate 49b that projects up from the base assembly 49a in contact with underside of the mounting arm 10, hitch mount 5, or chassis. The support brace 47 can help distribute loads and stabilize the lift device 6 when heavy or near weight capacity objects are secured to the lifting boom 30.

As shown in FIGS. 2 and 4, the vertical member 20 extends relative to the mounting arm 10 along the vertical direction V to support the lifting boom 30. As illustrated the vertical member 20 is elongate along the vertical axis 9a and includes a lower end 24 and an upper end 26 spaced from the lower end along the vertical axis 9a. The vertical member 20 includes an outer casing 22 and a pair of plates 28a and 28b. The pair of plates 28a and 28b can define the upper end 26 of the vertical member 20. The plates 28a and 28b are spaced apart from the each other to define a gap 27 that extends between the plates 28a and 28b. The gap 27 receives offset leg 33 of the lifting boom 30. The outer casing 22 is configured to be rotatable about the first axis 9a as will be explained below. The lifting boom 30 is rotatably coupled to the outer casing 22 at the plates 28a and 28b via a pivot member 38. The pivot member 38 defines the second axis 9b. Thus, the lifting boom 30 rotates about the first axis 9a along with rotation of the outer casing 22. Furthermore, the lifting boom 30 is rotatable about the second axis 9b with respect the plates 28a and 28b and thus the vertical member 20.

Referring to FIGS. 2 and 5, the lifting boom 30 includes a body 32 and a pivot member 38 that rotatably couples the lifting boom 30 to the vertical member 20. The body 32 includes a base end 34 disposed at the vertical member 20, first support arm 35a, second support arms 35b, and a working end 36 configured to be secured to the object. The base end 34 may be referred to a first end and the working end 36 may be referred to as the second end. The body 32 is substantially L-shaped so that when the lifting boom 30 is in a stowed configuration 1A as shown in FIG. 5, the first support arm 35a is substantially parallel to the side of the vehicle 4 and extends along a first direction A aligned with the horizontal direction H, and the second support arm 35b extends over the rear bed of the vehicle 4 in a second direction B that is perpendicular to the first direction A so that the working end 36 is positioned along the vehicle centerline 8. The base end 34 defines an offset leg 33 that extends downwardly between the plates 28a and 28b and is rotatably coupled to the plates 28a and 28b via the pivot member 38. The working end 36 includes a wench and hook assembly that can be secured to an object. While a wench is shown, the working end 36 may include other devices, such as a hook, clamp, a groove to receive a tie or strap. The offset leg 33 carries the pivot member 38.

Figure 9:
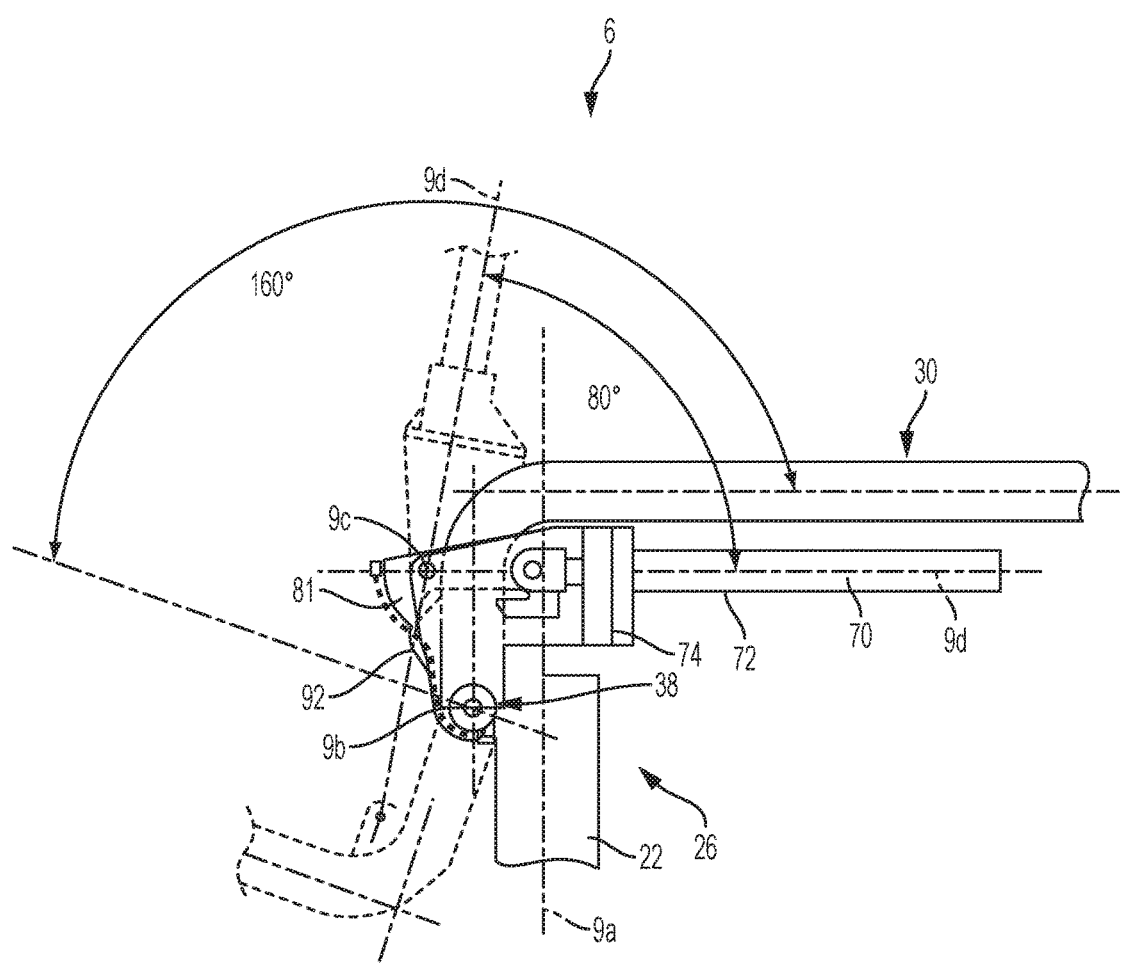
FIG. 9 is a side view of a portion the lift device shown in FIG. 1, illustrating operation of a second actuation system.
Figure 10:
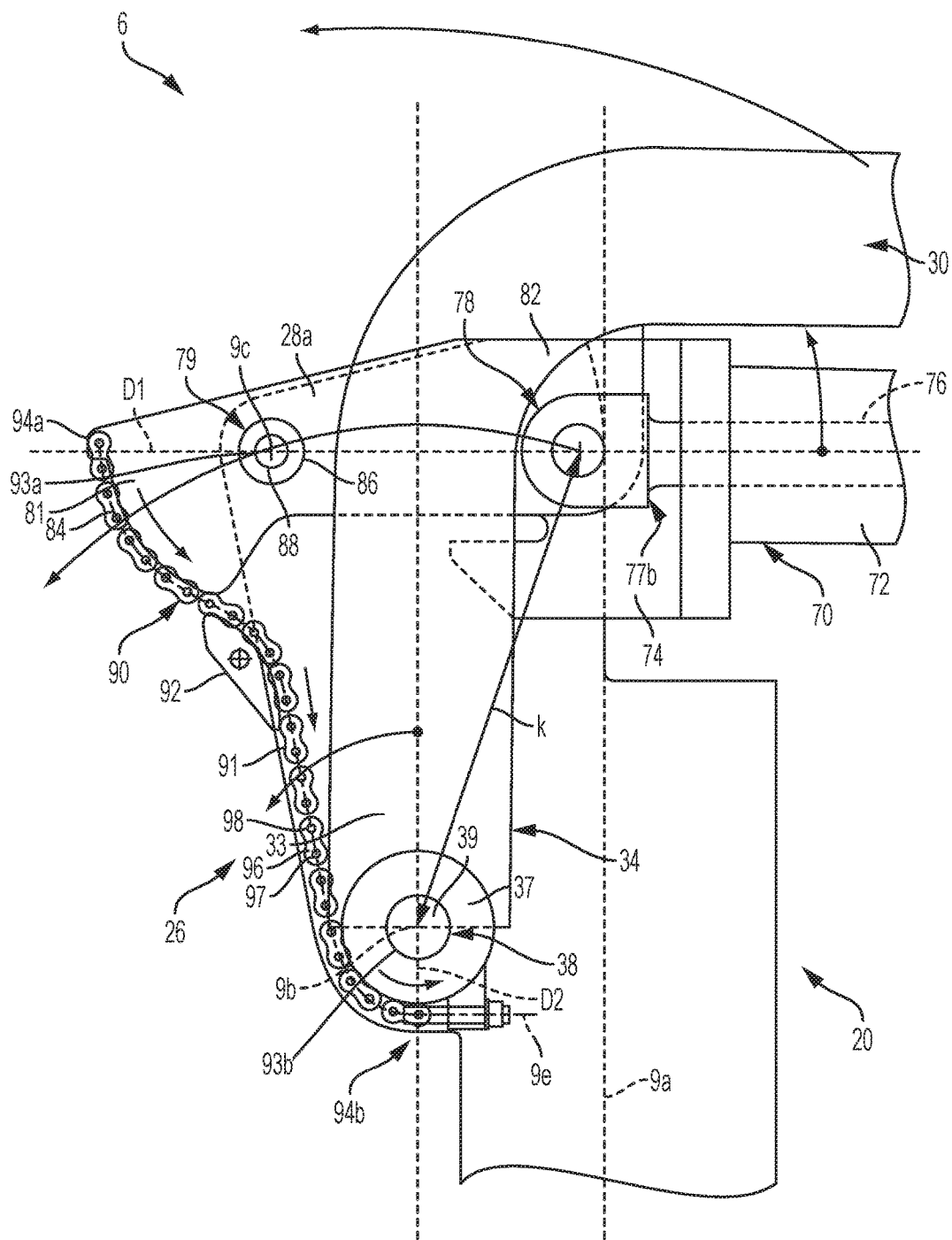
FIG. 10 is a detailed side view of a portion of the lift device illustrated in FIG. 1, illustrating the second actuation system and a stabilizing device according to an embodiment of the present disclosure.

Turning to FIGS. 9 and 10, the pivot member 38 rotatably couples the lifting boom 30 to the upper end 26 of the vertical member 20 so that the lifting boom 30 can rotate about second axis 9b. As illustrated, the pivot member 38 includes rotational assembly that has a housing 37 and a pin 39. The pin 39 defines and extends along the second axis 9b. In embodiment, the housing 37 is fixed to the offset leg 33 of the lifting boom 30. The pin 39 extends through a passage in the housing 37 and into fixed engagement with the upper plates 28a and 28b. The housing 37 and the based end 34 of the lifting boom 30 can rotate about the pin 39 in response to activation of the second actuation system 70. Consequently, the lifting boom 30 is rotatable about the second axis 9b. Alternatively, the pin 39 can be fixed to the housing 37 but rotatably coupled to the plates 28a and 28b. In such an embodiment, both the housing 37 and pin 39 are rotatable with respect to the plates 28a and 28b.

Turning now to FIGS. 6-8B, the vertical member 20 includes a first actuation system 40 that is operable to cause the lifting boom 30 (FIG. 2) to rotate about the vertical or first axis 9a. As illustrated, the first actuation system 40 is a hydraulic system that includes a hydraulic power unit 42 and an actuation assembly 44. The hydraulic power unit 42 includes a power source (12 volt), a pump, a reservoir for holding the fluid, supply line 62a, and supply line 62b. The power source (12 volt), pump, and reservoir are not shown. The hydraulic power unit 42 is capable of up pumping fluid into the actuation assembly 44 up to about 2900 psi. While a hydraulic system is illustrated in figures and described blow, the first actuation system is not limited to a hydraulic system. For instance, the first actuation system can be gear-driven actuator or other types of actuators that are operable to cause the lifting boom 30 to rotate about the first axis 9a.

Continuing with FIG. 6-8B, the actuation assembly 44 includes an inner vertical shaft 46, a vane 48 fixed to an inner surface 21 of the outer casing 22, and a dam 50 fixed to the vertical shaft 46. The vertical shaft 46 extends vertically from a lateral end 19 of the mounting arm 10. The vane 48 extends partially around the vertical shaft 46 so as to partially define first and second chambers 52a and 52b. The first chamber 52a extends from a side 45a of the vane 48 to a dam side 51a. The second chamber 52b extends from vane side 45b of the vane 48 to the dam side 51b. The chambers 52a and 52b are configured to house a hydraulic fluid therein. The vane 48 is fixed to and extends from the inner surface 21 of the outer casing 22 to the vertical shaft 46 along a radial direction R toward the first axis 9a. Seals 61a along interface of the vane 48 and vertical shaft 46 and seals 61b disposed along the interface of the dam 50 and casing 22 maintain fluid separation between first and second chambers 52a and 52b. The actuation assembly 44 also includes an upper seal 58a and a lower seal 58b that each extend from the vertical shaft 46 to the outer casing 22. The vane 48 and the dam 50 extend from the lower seal 58b to the upper seal 58a in the vertical direction V along the first axis 9a. The actuation assembly 44 also includes an upper bearing 60a and a lower bearing 60b that facilitates rotational movement between the casing 22 and shaft 46. The upper bearing 60a is disposed along the vertical shaft 46 above the upper seal 58a. The lower bearing 60b is disposed along the vertical shaft 46 below the lower seal 58b.

The actuation system 40 includes first and second supply lines 62a and 62b that extend from the power unit 42 to the first and second chambers 52a and 52b, respectively, first and second lock valves 56a and 56b disposed along supply lines 62a and 62b. The first and second supply lines 62a and 62b are coupled to first and second ports 54a and 54b so to be selectively flow communication with the first and second chambers 52a and 52b, respectively. The lock valves 56a and 56b are configured to either block or permit fluid flow between the unit 42 and chambers 52a and 52b. The first supply line 62a, valve 56b, and first port 54a control the flow of fluid from the unit 42 to the first chamber 52a and define a first flow circuit. The second supply line 62b, valve 56b, and the second port 52b control the flow of fluid from the unit 42 to the second chamber 52b and define a second flow circuit. As illustrated, the first and second flow circuits are disposed inside the vertical shaft 46. The first and second flow circuits could be disposed externally as needed. The first actuation system 40 is configured for reverse flow. For instance, either the first flow circuit can be the supply circuit that feeds fluid to the chambers 52a and 52b or the second flow circuit can be the return circuit. The actuation system 40 can reverse flow so that the second flow circuit is the supply circuit and the first flow circuit is the return circuit.

Figure 8A:
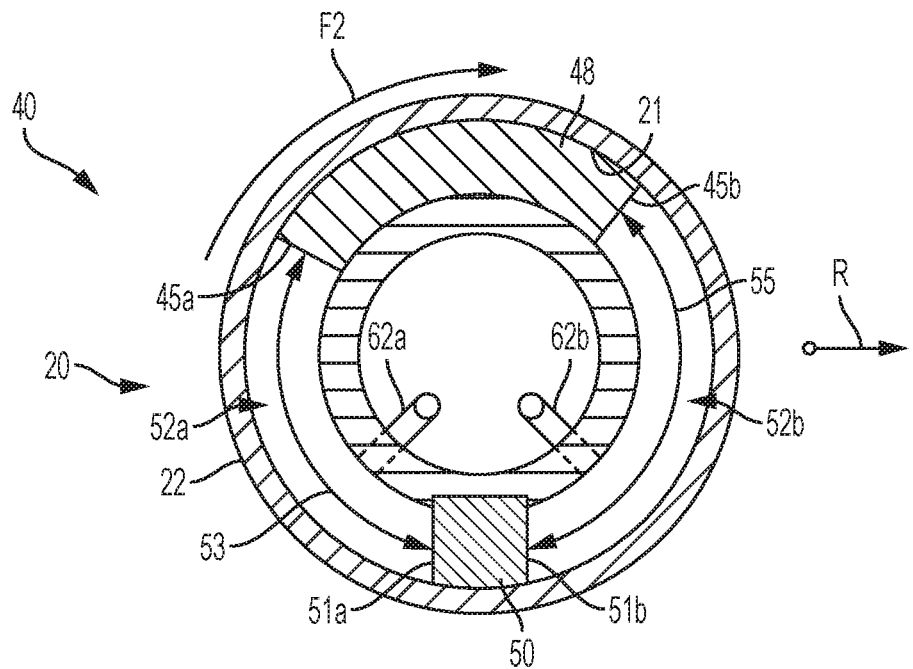
FIG. 8A is a top cross-sectional views of a portion of the lift device taken along line 8-8 in FIG. 2 illustrating the first actuation system in a first operational state.
Figure 8B:
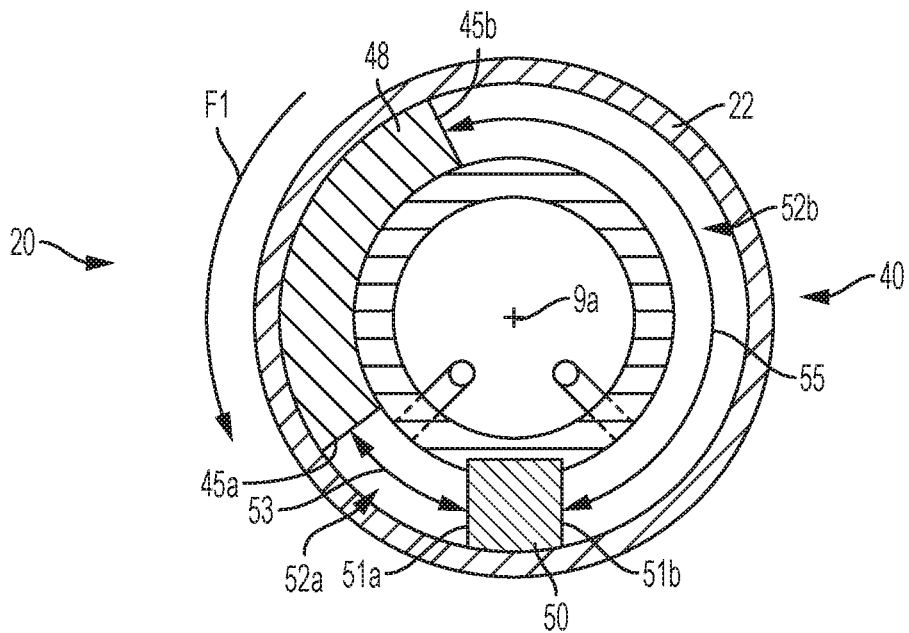
FIG. 8B is a top cross-sectional views of a portion of the lift device taken along line 8-8 in FIG. 2 illustrating the first actuation system in a second operational state.

Turning to FIGS. 8A and 8B, the first actuation system 40 is configured to cause the outer casing 22 and the attached lifting boom 30 to rotate about the first axis 9a. As illustrated, the vane 48 and casing 22 are moveable relative to and about the vertical shaft 46. The dam 50 extends from the vertical shaft 46 toward the inner surface 21 of the outer casing 22 along the radial direction R so that the outer casing 22 is moveable relative to the dam 50. The volume of the chambers 52a and 52b is therefore a function of the rotational distance between the vane 48 and the dam 50. The vane 48 and dam 50 are spaced apart by a first arc 53 that extends from vane side 45a to dam side 51a about the axis 9a. In addition, the vane 48 and dam 50 are separated by a second arc 55 that extends from vane side 45b to dam side 51b about the axis 9a. In the stowed configuration 1A, as shown in FIG. 8A, the first arc 53 is about 110 degrees and the second arc 55 is about 110 degrees. The vane 48 and casing 22, and thus the attached lifting boom 30, are rotatable from the stowed configuration 1A about 110 degrees in a first rotational direction F1 toward a working configuration 1B, e.g. as shown in FIG. 8B. Alternatively, the vane 48 and casing can rotate from the stowed configuration 1A about 110 degrees in a second rotational direction F2 about the axis 9a. Thus, the angular amount that the vane 48 and casing 22 can rotate about the axis 9a is about 220 degrees. The mechanism for adjusting the rotational position of the vane 48 and casing will be described further below.

Continuing with FIGS. 8A and 8B, as described above, the actuation system 40 is configured to cause the vane 48 and casing 22 to rotate about the axis 9a so as to cause the lifting boom 30 is configured to rotate about the first axis 9a. The vane 48 and dam 50 are sized such that the first chamber 52a and the second chamber 52b extend around the vertical axis 9a along the first and second arcs 53 and 55. The chambers 52a and 52b house a fluid supplied therein via supply lines 62a and 62b from the hydraulic power unit 42. As the vane 48 and casing 22 rotate about the vertical shaft 46 relative to the dam 50, the volume of the first and second chambers 52a and 52b vary. For instance, as the vane 48 and casing 22 rotate around the vertical shaft 46 along a rotational direction R2, the volume of the first chamber 52a increases while the volume of the second chamber 52b decreases. As the vane 48 and casing 22 rotate around the vertical shaft 46 along a rotational direction F1, the volume of the first chamber 52a decreases and the volume of the second chamber 52b increases. Pressure differential between the fluids in first chamber 52a and the second chambers 52b are configured to cause rotation of the vane 48 and changes in chamber volume, as will be further described below.

The hydraulic power unit 42 is configured to selectively modify pressure differential between the first chamber 52a and the second chamber 52b so as to cause the vane 48 and the outer casing 22 to selectively rotate relative to the vertical shaft 46. More specifically, an electric input directs a pressure differential in the fluid between the first chamber 52a and the second chamber 52b so as to cause the vane 48 and outer casing 22 to rotate about the vertical shaft 46. In the stowed configuration 1A, as shown in FIG. 8A, the first chambers 52a and 52b are closed and fluid is at or near atmospheric pressure. In the stowed configuration 1A, the vane 48 and dam 50 are disposed opposite with respect to each other such that first and second arcs 53 and 55 are about equal. Furthermore, the volume of first and second chambers 52a and 52b is about equal. To transition the actuation assembly 44 from the stowed configuration 1A shown in FIG. 8A to the working configuration 1B shown in FIG. 8B, an electrical input is applied to the unit 42. In response to the electrical input, the hydraulic power unit 42 direct fluids through the first supply line 62a and through the open lock valve 56a and the first port 54a into first the first chamber 52a. Pressure from the pump, which can reach up to 2900 psi, increases pressure of the fluid in the first chamber 52a. Fluid exits the second chamber 52a via port 54b and pass through the open lock valve 56b. Pressure in the second chamber 52b is thus much lower (between about 50 to 200 psi) than the pressure in the first chamber 52a. The pressure differential between the first and second chambers 52a and 52b cause the vane 48 and casing 22 to rotate about the shaft 46 from the initial stowed configuration 1A as shown in FIG. 8A, to the rotated or working configuration 1B as shown in FIG. 8B, resulting in the lifting boom 30 rotating about the first axis 9a. In response to another electrical input, for instance an opposite current can cause the pressure differential between the chambers 52a and 52b to reverse, causing the vane 48 to rotate back to its initial position along rotational direction F2 as shown in FIG. 8B.

Figure 7:
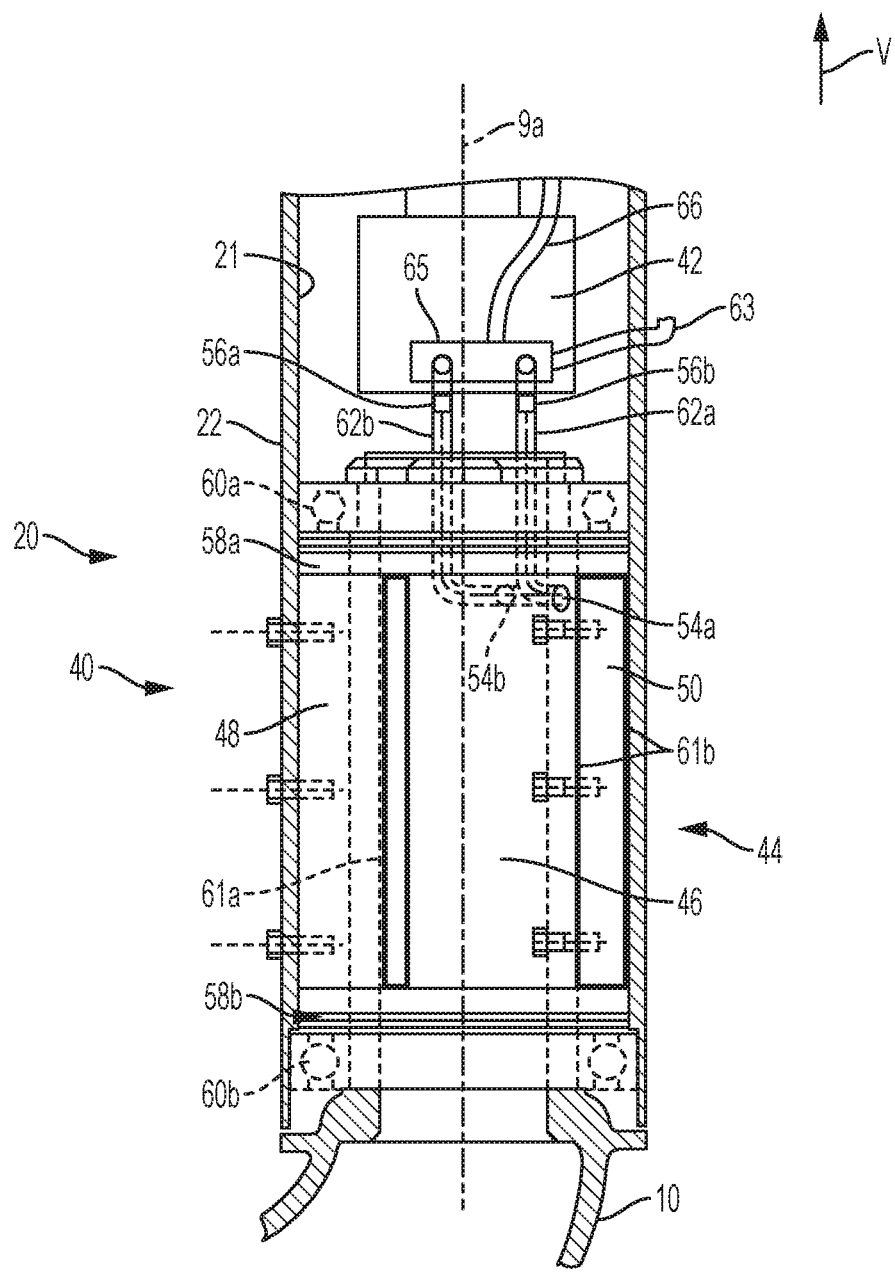
FIG. 7 is a cross-sectional view of a portion of lift device taken along line 7-7 in FIG. 2, illustrating components of the first actuation system.

As shown in FIG. 7, the hydraulic power unit 42 can control operation of either or both the first actuation system 40 the second actuation system 70. The lift device 6 may include a selector valve 63 that controls flow of the fluid between the first and second actuation systems. In one embodiment, a junction 65 is configured to divide flow between the supply line 62a (or 62b) to actuation assembly 44 and a supply line 66 into the second actuation system 70.

The selector value 63 is operably coupled to the junction 65 and can be operated to direct fluid flow between either first actuation system 40 or the second actuation system 70. As illustrated, the selector value 63 is manually operated. In an alternative embodiment, the selector valve 63 can be operated automatically via an electrical input.

Figure 11:
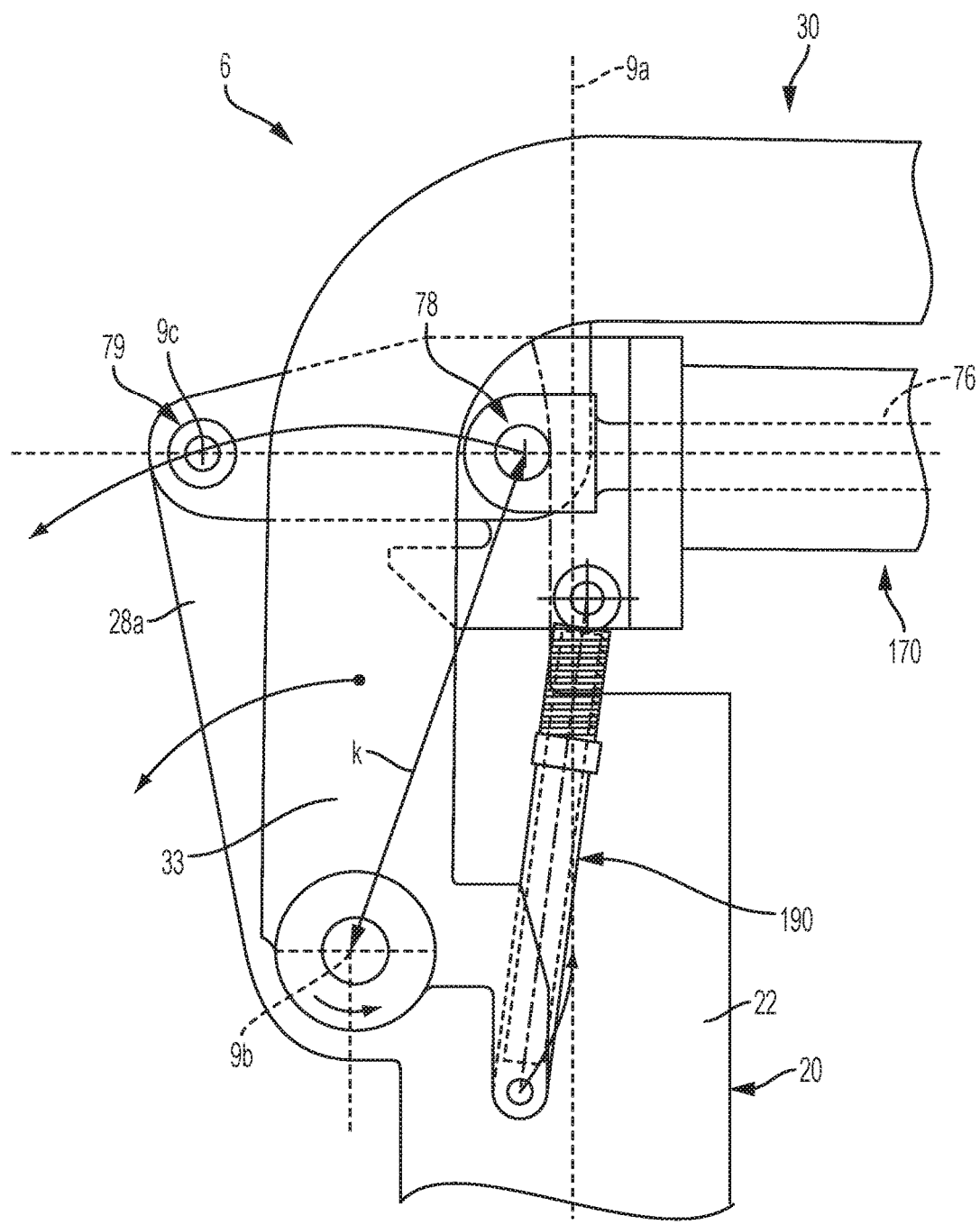
FIG. 11 is a detailed side view of a portion of the lift device illustrated in FIG. 1 including a stabilizing device according to another embodiment of the present disclosure.

FIGS. 9-11 illustrate operation of the second actuation system 70. Turning initial to FIGS. 9 and 10, the lift device 6 includes a second actuation system 70 configured to cause the lifting boom 30 to rotate about the second axis 9b. The second actuation system 70 is configured to pivot about a third axis 9c that is parallel to the second axis 9b. As the lifting boom 30 rotates about second axis 9b, the second actuation system 70 rotates about the third axis 9c. As illustrated, the second actuation system 70 can rotate the lifting boom 30 about the second axis 9b up to about 160 degrees. The second actuation system 70 is configured to rotate about the third axis 9c up to about 80 degrees. Thus, the lifting boom 30 and second actuation system 70 rotate about their respective axes 9b and 9c an angular amount with respect to each other at 2:1 ratio.

As shown in FIGS. 9 and 10, the second actuation system 70 is elongate along a central axis 9d and further includes a casing 72, a yoke 74 supported by the casing 72, an inner rod 76 moveably disposed in the casing 72, and a coupling member 78 that rotatably couples the inner rod 76 to the base end 34 of the lifting boom 30. The coupling member 78 is disposed on the inner rod 76 so that the coupling member 78 advances along with advancement of the inner rod 76 with respect to the yoke 74. The casing 72 is a tubular housing that contains a portion of the rod 76 and a mechanism configured to advance the rod 76 in a direction aligned with central axis 9d. The inner rod 76 has a rear end (not shown or numbered) and a forward end 77b spaced from the rear end along the central axis 9d. The rear end is disposed in the casing 72 and the forward end 77b is rotatably coupled to the lifting boom 30 via the coupling member 78. The yoke 74 is also rotatably coupled to the plate 28a and/or plate 28b of the vertical member 20 at a pivot 79. The pivot 79 defines the third axis 9c. The yoke 74 includes at least one plate 81 that has a base 82 fixed to the casing 72 and an outer edge 84 spaced from the base 82 along the central axis 9d. As illustrated, the pivot 79 is disposed between the edge 84 and base 82 along axis 9d. The outer edge 84 is curved with respect to the pivot 79. The coupling member 78 includes a body 86 and a pin 88 disposed in the body 86. The pin 88 is secured to the offset leg 33 of the lifting boom 30. The body 86 is fixed to the inner rod 76 and is also rotatable about the pin 88. Alternatively, a pin 88 is fixed to the body 86 yet rotatably coupled to the offset leg 33 and the pin 88 rotates as the second actuation system 70 rotates.

The lift device 6 includes at least one stability linkage 90 connected to the second actuation system 70 and the lifting boom 30. The stability linkage 90 is configured to stabilize at least a portion of the second actuation system 70 as the lifting boom 30 rotates about second axis 9b. The lift device 6 further includes a curved guide 92 coupled to the upper end 26 the vertical member 20. The stability linkage rides along the curved guide 92 as it extends from yoke plate 81 to the base end 34 of the lifting boom 30. The stability linkage 90 may be a flexible body 91 that is elongate along a linkage axis 9e and includes a first end 94a and a second end 94b spaced from the first end 94a along the axis 9e. The first end 94a can be coupled to the actuation system 70 and the second end 94b can be coupled to the base end 34 of the lifting boom 30. As illustrated, the stability linkage 90 is coupled to the yoke plate 81 at a first attachment point 93a such that a portion of the linkage body 91 curves around and along with the curved outer edge 84 of the yoke plate 81. Likewise, the second end 94b of the linkage body 91 is coupled to the housing 37 and pin 39 at a second attachment point 93b such that a portion of the linkage body 91 curves around the housing 37 toward the yoke plate 81. The portion of the linkage body 91 adjacent the first end 94a and the portion of the linkage body 91 adjacent the second end 94b each curve about the third axis 9c and the second axis 9b, respectively, along similar arcs. Furthermore, the first attachment point 93a is spaced a first distance D1 from pivot 79 along central axis 9d, and the second attachment point 93b is spaced a second distance D2 from the second axis 9b along a line aligned with the vertical direction V. The first and second distances D1 and D2 are selected to have a 2:1 ratio with respect to each other. A 2:1 ratio distance D1 to D2 maintains synchronization of rotation of the lifting boom 30 and the second actuation system 70 about the second axis 9b and the third axis 9c, respectively. The stability linkage 90 is curved along a portion of the outer edge 84, a surface of the curved guide 92 that faces the lifting boom 30, and a surface of housing 37 and is secured to the boom offset leg 33.

As illustrated, the second actuation system 70 is a linear actuation system operated via the hydraulic power unit 42 or optionally via a different power source. In other embodiments, the second actuation system 70 can be other types of actuators, such as gear-based actuators, struts, and screw-type actuators.

As illustrated in FIG. 10, the stability linkage is a chain including a plurality of links 96 connected end-to-end. Adjacent links 96 are coupled together by a pin 97 that defines a pin axis 98. The adjacent links 96 are pivotable relative to each other about each respective pin axes 98. In alternative embodiment, the stability linkage 90 can be a cable. The stability linkage 90 can define a length L that extends from the first end 94a to the second end 94b along the axis 9e. As the lifting boom rotates about the second axis 9b, the length L of the stability linkage 90 does not significantly change.

During use, an electrical input causes the second actuation system 70 to advance the inner rod 76 along a direction aligned with central axis 9d. Force transferred from the coupling member 78 to the lifting boom 30 causes the lifting boom 30 to rotate about the second axis 9b from a stowed configuration 1A into a working configuration 1B as shown in FIG. 3. As the lifting boom 30 rotates about second axis 9b, the second actuation system 70 rotates about the third axis 9c. The distance K between the second axis 9b and the coupling member 78 is fixed throughout rotation of the lifting boom 30 and the second actuation system 70. The further the extent that lifting boom 30 rotates about second axis 9b, the greater the extent that the inner rod 76 translates along the central axis 9d. In typical lift designs, the stability linkage was used to support second actuation system 70 along in region where the coupling member approached the pivot 79 between the yoke plate 81 and the vertical member 20. In the present disclosure, however, because the stability linkage 90 is fixed to the yoke plate 81 and to the offset set leg 33 of the lifting boom 30, the stability linkage 90 supports the position of the second actuation system 70 through the entire rotation of the lifting boom 30 about the second axis and rotation of the second actuation system 70 about the third axis 9c.

An alternative embodiment of the second actuation system 170 and stability linkage 190 is illustrated in FIG. 11. As shown in FIG. 11, a stability linkage 190 is a rigid and extendable linkage that has a minimum length that increases as the lifting boom 30 rotates about second axis 9*b* and the second actuation system 170 rotates about third axis 9*c*.

While the foregoing description and drawings represent the preferred embodiment of the present invention, it will be understood that various additions, modifications, combinations and/or substitutions may be made therein without departing from the spirit and scope of the present disclosure as defined in the accompanying claims. In particular, it will be clear to those skilled in the art that the present disclosure may be embodied in other specific forms, structures, arrangements, proportions, and with other elements, materials, and components, without departing from the spirit or essential characteristics thereof. One skilled in the art will appreciate that the present disclosure may be used with many modifications of structure, arrangement, proportions, materials, and components, which are particularly adapted to specific environments and operative requirements without departing from the principles of the present disclosure. In addition, features described herein may be used singularly or in combination with other features. For example, features described in connection with one component may be used and/or interchanged with features described in another component. The presently disclosed embodiment is therefore to be considered in all respects as illustrative and not restrictive, the scope of the present disclosure being indicated by the appended claims, and not limited to the foregoing description.

It will be appreciated by those skilled in the art that various modifications and alterations of the present disclosure can be made without departing from the broad scope of the appended claims. Some of these have been discussed above and others will be apparent to those skilled in the art.

What is claimed:

1. A lift device configured to be mounted to a vehicle positioned on a surface and configured to carry an object from one location to another location relative to the vehicle, the lift device comprising:
   a mounting arm that includes a mounting member, the mounting member configured to be mounted to the rear of the vehicle;
   a vertical member that extends relative to the mounting arm along a vertical direction, the vertical member including a lower end, and an upper end spaced from the lower end along a first axis that is aligned with the vertical direction;
   a moveable lifting boom including a first end and a second end, the first end being coupled to the upper end of the vertical member, and the second end is configured to be secured to the object;
   a first actuation system disposed along the vertical member, the first actuation system configured to cause the lifting boom to rotate about the first axis;
   a second actuation system configured to cause the lifting boom to rotate about a second axis that is perpendicular to the first axis; and
   a flexible stability linkage connected to the second actuation system and the lifting boom, the flexible stability linkage configured to stabilize at least a portion of the second actuation system as the lifting boom rotates about the first axis and the second axis, wherein the flexible stability linkage is elongate along a linkage axis to define a length, the length of the flexible stability linkage does not increase as the lifting boom rotates about the first axis and the second axis.

2. The lift device of claim 1, wherein the second actuation system includes at least one plate that is rotatably coupled to the upper end of the vertical member at a pivot, the pivot defining a third axis about which the second actuation system rotates, wherein the third axis extends along a direction that is parallel to the second axis.

3. The lift device of claim 2, wherein the at least one plate defines an outer edge that is spaced apart from the pivot, wherein the flexible stability linkage is coupled to the outer edge and to the first end of the lifting boom.

4. The lift device of claim 2, further comprising a curved guide coupled to the upper end of the vertical member, wherein the stability linkage rides along the curved guide as it extends from the at least one plate to the first end of the lifting boom.

5. The lift device of claim 1, wherein the flexible stability linkage is a cable.

6. The lift device of claim 1, wherein the flexible stability linkage is a chain including a plurality of links connected end-to-end.

7. The lift device of claim 6, wherein adjacent links of the plurality of links are coupled together by a pin that defines a pin axis, and the adjacent links are pivotable relative to each other about each respective pin axis.

8. The lift device of claim 1, wherein the second actuation system extends along a central axis, the second actuation system comprises:
   a casing;
   a yoke supported by the casing and rotatably coupled to the upper end of the vertical member about a third axis that is parallel to the second axis; and
   an inner rod having a rear end and a forward end spaced from the rear end along the central axis, the rear end disposed in the casing and the forward end rotatably coupled to the lifting boom.

9. The lift device of claim 8, wherein the second actuation system includes a coupling member that is disposed at the forward end of the inner rod and that is fixed to the lifting boom, wherein the coupling member passes substantially through the third axis during an initial portion of an angular amount that the lift boom rotates about the second axis.

10. The lift device of claim 8, wherein the yoke includes at least one plate, the at least one plate defining a base end disposed on the casing, an outer edge that is spaced apart from the casing along the central axis, and a pivot disposed between the outer edge and the base end, wherein the pivot defines the third axis.

11. The lift device of claim 1, wherein the first actuation system is a hydraulic system configured to cause the lifting boom to rotate about the first axis.

* * * * *